Dec. 23, 1969  C. D. LESLIE  3,485,333
ARTICLE ORIENTER AND FEEDER
Filed July 27, 1967  3 Sheets-Sheet 1

INVENTOR
CHARLES D. LESLIE

BY
*B. Eshelinger*
ATTORNEY

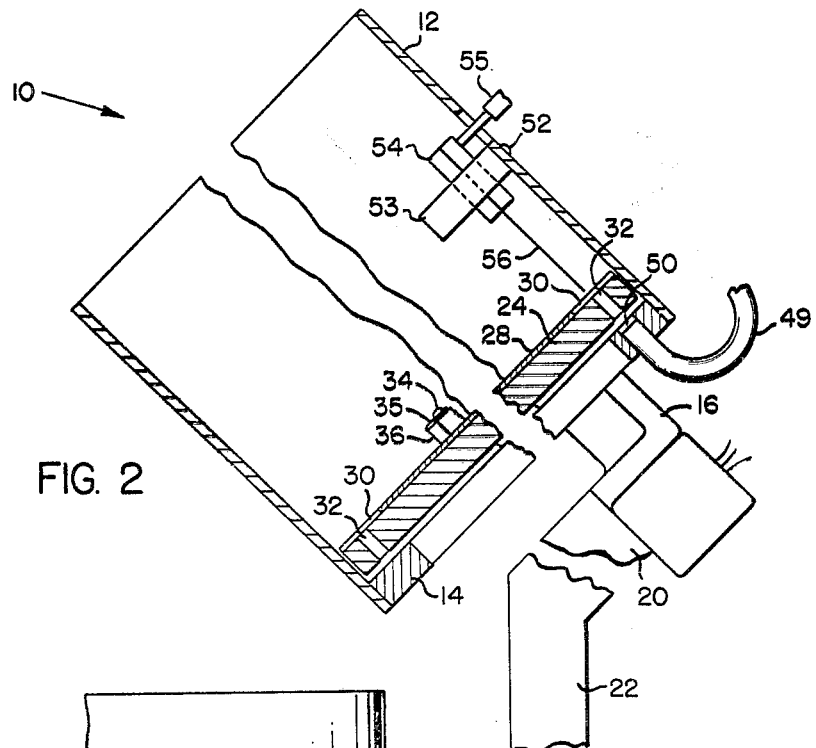
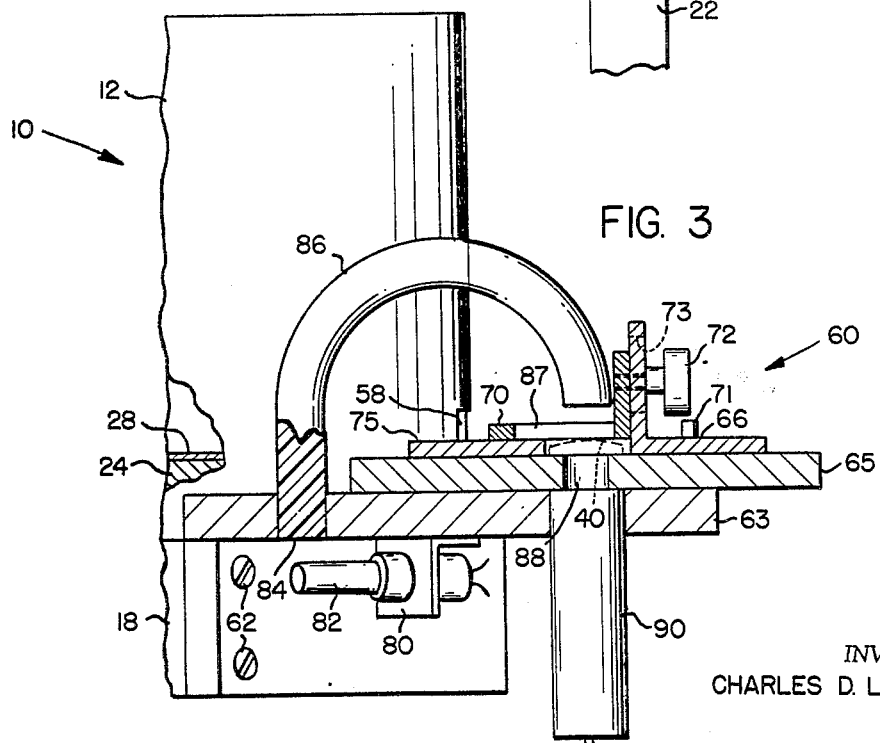

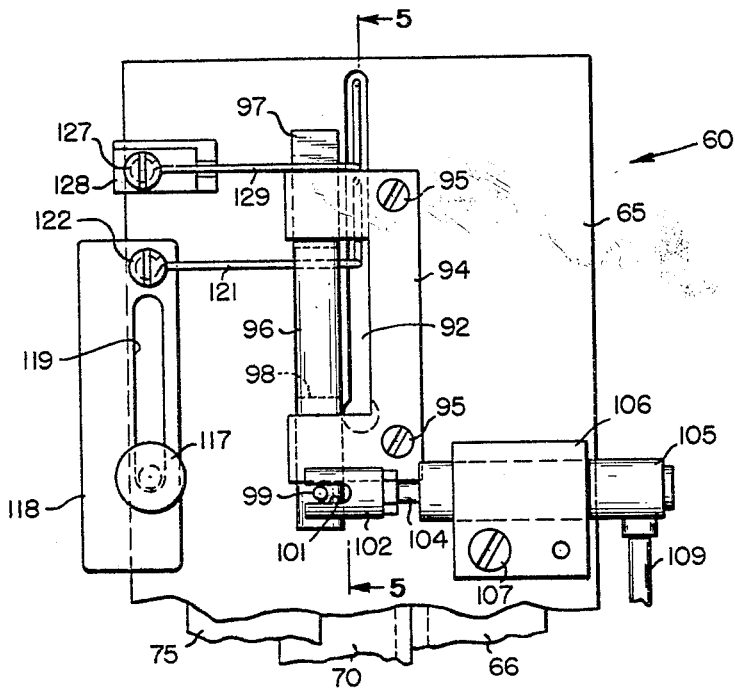
FIG. 4
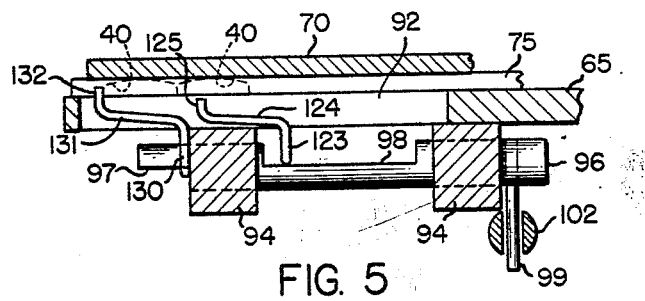
FIG. 5
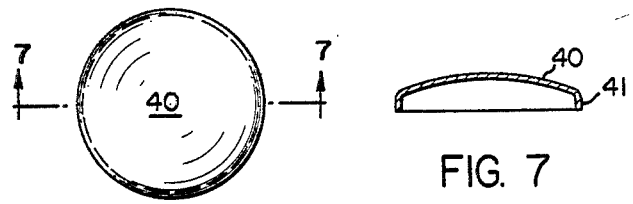
FIG. 6
FIG. 7

United States Patent Office 3,485,333
Patented Dec. 23, 1969

3,485,333
ARTICLE ORIENTER AND FEEDER
Charles D. Leslie, Pittsford, N.Y., assignor to Cap-Roc Inc., Rochester, N.Y., a corporation of New York
Filed July 27, 1967, Ser. No. 656,480
Int. Cl. B65h 9/00; B23q 7/02; B65g 47/24
U.S. Cl. 193—43
12 Claims

ABSTRACT OF THE DISCLOSURE

A hopper holding small articles includes a rotating disc having an inclined axis and pockets to convey the articles to a chute. As the disc rotates the pockets carry the articles under a feeler. If an article is not properly positioned in a pocket, the feeler trips a valve causing air to blow the article out of the pocket. Pneumatically-operated detents normally prevent the lowermost article from dropping out of the chute, and hold the second lowermost article back while the lowermost is discharged. A photoelectric eye stops the disc if articles back up too far in the chute.

---

This invention relates to feeding mechanism and more particularly to apparatus for orienting and feeding button shells to a predetermined assembly point.

Hopper-type button orienters are in common use for orienting buttons and discharging them into a chute for delivery to a sewing machine or other apparatus using the buttons. While known apparatus of this type is satisfactory for certain applications, it is not usable for orienting and feeding shells used in the manufacture of cloth-covered buttons. The shells used in making such buttons generally are quite fragile, and must be handled carefully to prevent damage thereto. It is desirable, however, to have a feeding mechanism which will orient and feed button shells one-by-one, automatically to a station where the shells may be clamped over fabric covers and onto shank-bearing members having eyelets for sewing the buttons to garments.

It is an object of this invention to provide an improved orienter for use in orienting button shells.

Another object of this invention is to provide an improved orienter and feeder mechanism, which will considerably expedite the manufacture of cloth-covered buttons.

Another object of this invention is to provide an improved article orienter and feeder mechanism which will automatically interrupt the operation of the orienter when the articles in a delivery chute connected to the orienter back up a predetermined distance.

A more specific object of this invention is to provide a combination orienter and feeder mechanism, which is capable of orienting and feeding rather fragile articles one by one to a predetermined point without damaging the articles.

Other objects of the invention will be apparent hereinafter from the specification and from the recital of the appended claims, particularly when read in conjunction with the accompanying drawings.

In the drawings:

FIG. 2 is a fragmentary sectional view taken along the line 2—2 in FIG. 1 looking in the direction of the arrows;

FIG. 3 is an enlarged, fragmentary sectional view taken along the line 3—3 in FIG. 1 looking in the direction of the arrows;

FIG. 4 is a fragmentary view on the same scale as FIG. 3, looking at the underside of the discharge end of the feeder chute;

FIG. 5 is a fragmentary sectional view taken along line 5—5 in FIG. 4 looking in the direction of the arrows;

FIG. 6 is an enlarged plan view of one type of button shell, for which this orienting and feeding mechanism is adapted; and FIG. 7 is a cross-section of this shell taken on line 7—7 in FIG. 6 looking in the direction of the arrows.

Figure 1:
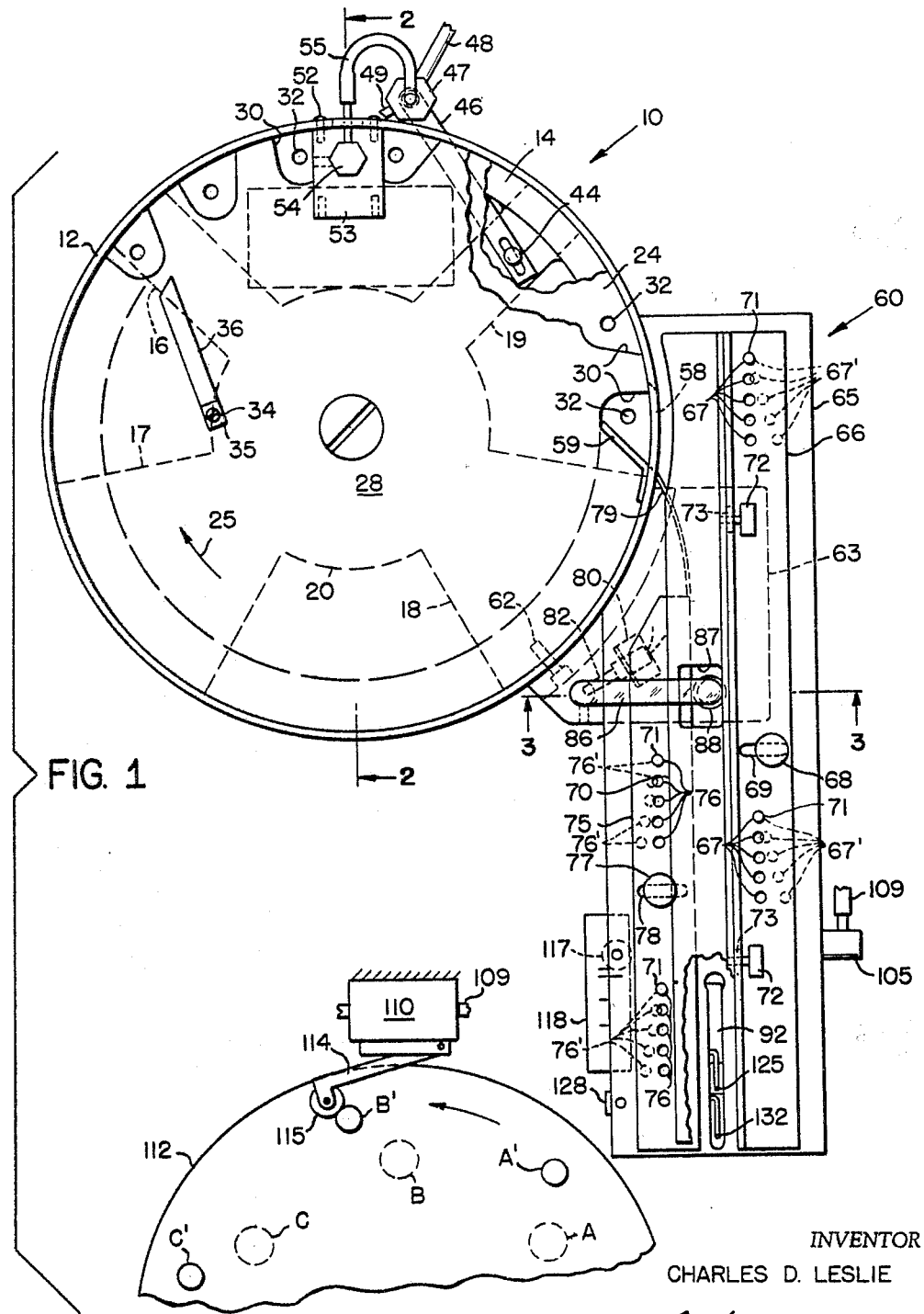
FIG. 1 is a fragmentary plan view of an article orienter and feeder mechanism made in accordance with one embodiment of this invention, portions of the mechanism being cut away.

Referring now to the drawings by numerals of reference, 10 denotes a hopper comprising a stationary cylinder or drum 12, which is open at its upper end and is secured at its lower end to a ring 14, that is fastened in turn to the spoke-like arms 16, 17, 18 and 19 of a hub 20 of a bracket or post 22.

Mounted to rotate in the bottom of drum 12 is a disc 24. The post 22 is used to support hopper 10 on a table, or the like, with the upper, open end of the drum inclined at approximately 45 degrees to the horizontal to secure the desired tilt of the disc 24. Disc 24 is adapted to be driven in the direction indicated by arrow 25 (FIG. 1) by a conventional motor (not illustrated).

Secured by a screw 26 on top of disc 24 is a thin plate 28. This plate extends to the periphery of the disc 24, and has around its outer edge a plurality of equi-angularly spaced recesses 30, which open onto the periphery of the plate. Registering with each of the pockets 30 is a duct or port 32 in disc 24. The recesses 30 form pockets for holding sheet metal or plastic button shells of the type designated at 40 in FIGS. 6 and 7. Each shell 40 is saucer-shaped and has a shallow, annular skirt portion 41. When a shell is properly seated in one of the pockets 30, its skirt portion 41 surrounds the registering duct 32.

Secured at one end thereof on disc 28 by a screw 34 and washer 35 is a flexible finger 36 of rubber, or the like. Finger 36 is offset from the axis of hopper 10, and the free end thereof acts as a pusher or deflector to help keep the button shells in the hopper 10 stirred up. As an alternative to using the finger 36, the trailing edge of each recess 30 may be formed with a slight vertical lip or projection to tumble the shells 40 during rotation of plate 28.

Secured at its inner end by a screw 44 (FIG. 1) to the spoke 19, and projecting at its opposite end outwardly beneath the bottom of the drum 10 is a strap 46. Mounted on the outer end of strap 46 is a valve 47 having an inlet end connected by a hose 48 to a supply of compressed air (not illustrated), and an outlet end connected by a hose 49 (FIGS. 1 and 2) to a hole or duct 50 formed in the ring 14 at the high side of hopper 10. Hole 50 is positioned so that during the rotation of the disc 24 the ducts 32 will register successively with hole 50.

Secured by screws 52 to the inside of the drum 12 is a block 53 in which is secured a pressure-operated pilot valve 54, which is connected at its upper end by a hose 55 to the valve 47. Projecting downwardly from the lower end of valve 54 is a slender feeler or valve-actuating member 56, the lower end of which terminates above the upper surface of the disc 28, so that it will not be engaged by a shell 40 that is properly seated in a pocket 30.

At its bottom drum 12 has therethrough a narrow discharge slot 58 (FIG. 1), which is angularly spaced approximately ninety (90) degrees from the opening 50 in ring 14. Secured to and projecting chordally into the drum just above the surface of plate 28 is a deflecting plate 59. When the hopper 10 is mounted as shown in FIGS.

1 and 2 with the hole 50 located at its high side, rotation of disc 24 (clockwise in FIG. 1) causes the shells 40 in the hopper to be stirred up and the shells which happen to seat properly in the pockets 30 are conveyed upwardly beneath feeler 56, and then downwardly to discharge opening 58, into which they are deflected by plate 59.

Supported on bracket 63 at one side of the hopper 10 is an adjustable chute 60. One leg of bracket 63 is secured by screws 62 (FIGS. 1 and 3) to spoke 18 outside of drum 12. Its other leg projects laterally outwardly from the drum beneath and adjacent to discharge opening 58.

Chute 60 comprises an elongate mounting plate 65 which is secured intermediate its ends to the upper surface of the lateral leg of bracket 63 to extend generally tangentially to the drum 12. The upper surface of plate 65 is coplanar with the upper surface of the disc 24 and with the lower edge of the discharge opening 58.

Secured to plate 65 in abutting relationship are two angle irons 66 and 70. One leg of angle iron 66 is adjustably fastened to plate 65 by a headed screw 68 which passes through a slot 69 in this leg and threads into plate 65. The angle iron 70 is fastened to the other leg of angle iron 66 by headed screws 72, which pass through slots 73 (FIG. 3) in this other leg, and thread into one leg of angle iron 70.

Interposed between the other leg of angle iron 70 and plate 65 for lateral adjustment toward and away from angle iron 66 is an elongate, flat plate 75 which is shorter than members 66 and 70. The rear or upper end (FIG. 1) of plate 75 is connected by flexible metal strap 79 to the outside of drum 12 at the lower end of the discharge slot 58. A headed screw 77 extends through a slot 78, in plate 75, and threads into the upper surface of plate 65 adjustably to secure plate 75 against movement thereon.

Each of the members 66 and 75 is provided with two groups of vertically spaced holes 67 and 76, respectively, which are adapted to cooperate with holes 67' and 76', respectively, in plate 65 for adjusting the width of chute 60. In each group of holes 67 and 76 the centerlines of the holes are in vertical registry with one another, but in each group of holes 67' and 76' the centerlines of the holes are offset from the top to the bottom of the group progressively further from the centerline of chute 60. The holes are arranged so that the uppermost in each group 67 and 76 will register only with the uppermost in the associated group 67' or 76', respectively, and the second uppermost in each group 67 and 76 will register only with the second uppermost in the associated group 67' or 76', etc. Members 66 and 75 are secured against lateral movement by four dowel pins 71, two of which are removably insertable in each pair of registering opening 67 and 67', and two others of which are releasably insertable in each pair of registering openings 76 and 76'.

If the lign or diameter of the shells 40 to be handled is increased, the chute width is increased by withdrawing dowels 71, loosening nuts 68 and 77, shifting members 66 and 75 outwardly or away from one another to place, for example, the lowermost holes 67 and 76 in registry with the lowermost holes 67' and 76', and the dowels 71 are then reinserted into the registering openings and the nuts 68 and 77 are tightened. Legends may be printed on members 66 and 75 adjacent the openings 67 and 76 to relate the effective width of the chute 60 with the positions of the dowel pins 71.

To adjust member 70, the nuts 72 are loosened, the member 70 is shifted until it engages the top of one of the button shells that is to be handled, and then member 70 is elevated slightly and the nuts 72 are tightened to assure vertical clearance for the shells 40 in the chute.

With members 66, 70 and 75 properly adjusted, shells that drop out of discharge port 58, slide on the upper surface of plate 65 beneath the angle iron 70, and between the confronting surfaces of plate 75 and angle iron 66. These surfaces form the guide chute for the button shells.

Mounted in a bracket 80 (FIG. 3), which is secured to the underside of the laterally projecting leg of the bracket 63, is a light bulb 82. Secured at its lower end an opening 84 in the bracket 63 adjacent the bracket 80 is a curved, generally inverted J-shaped "Plexiglas" light conduit 86 or the like. The opposite end of conduit 86 overlies an opening 87 (FIGS. 1 and 3) formed in one leg of the angle iron 70. The opening 87 registers with a further opening 88 formed in plate 65. Secured to bracket 63 with its light-sensitive end disposed in registry with opening 88, and hence with the light conduit 86, is a photoelectric cell 90.

Adjacent its lower end plate 65 has an elongate slot 92 (FIGS. 1, 4 and 5). Rotatably journaled adjacent opposite ends thereof in parallel arms of a generally U-shaped bracket 94 (FIG. 4), which is secured by screws 95 to the underside of plate 65, is a rocker shaft 96. At two axially spaced points therealong, and at diametrally opposite sides thereof, the shaft 96 is recessed and flatted off as denoted at 97 and 98. The flat 97 faces downwardly and is located on the lower end of shaft 96; and the flat 98 faces upwardly and is located intermediate the ends of the shaft.

A pin 99 is secured in the upper end of shaft 96, and projects downwardly into an axial slot or groove 101 formed in the outer, bifurcated end of a head 102 that is carried on the outer end of a reciprocable piston rod 104. The rod 104 is mounted to reciprocate in an air cylinder 105, which is secured by a bracket 106 and screw 107 to the underside of plate 65.

Cylinder 105 extends at right angles to the shaft 96; and at its outer end is connected by a hose 109 to one end of a stationary, normally-closed valve 110 (FIG. 1), which is supported adjacent a rotatable turntable 112. At its opposite end valve 110 is connected by a hose 113 to the same air supply (not illustrated) as valve 47. Pivoted on the valve 110 is a conventional operating arm 114, which carries a roller or wheel 115 that is positioned to be engaged successively by pins A', B', C', etc. on the turntable 112.

Adjustably secured by a screw 117 (FIGS. 1 and 4) to the underside of plate 65 along the side thereof opposite to that supporting the cylinder 105, is a narrow support plate 118. Screw 117 passes through a longitudinally extending slot 119 in plate 118, and threads into the underside of plate 65. A resilient metal wire 121 is secured at one end by a screw 122 to the forward end of plate 119, and at its opposite end extends transversely above and across the shaft 96 upwardly as at 123 (FIG. 5) into the slot 92 in plate 65, and then forwardly in the slot 92 as at 124. Adjacent its forward or upper end wire 121 is bent to form thereon a hook portion 125, which projects upwardly in the slot 92 beneath the horizontally disposed portion of member 70. A similar wire 129 is secured at one end thereof by a screw 127 to a spacer 128, which is secured to the underside of the plate 65 upwardly of the plate 118. At its opposite end wire 129 extends beneath the shaft 96 forwardly of the bracket 94, then upwardly as at 130 (FIG. 5) into the slot 92, and then forwardly in the slot as at 131. Like wire 121, the upper, forward end of wire 129 is bent to form a hook portion, here designated 132, which projects upwardly in the slot 92 beneath member 70, and forwardly of the hook portion 125 on the wire 121. Wires 121 and 129 are manipulated by shaft 96 to release shells 40 one by one from the discharge end of chute 60, as described below.

In use a plurality of like shells 40 are placed in the orienting drum 10; and the angle iron 66 and plate 75 are adjusted either toward or away from one another until the confronting article-guiding surfaces thereon are spaced from one another a distance slightly greater than the diameter of one of the shells 40. Also the angle iron 70 is adjusted vertically on member 66 until the underside of angle iron 70 is spaced above the top of plate 65 a distance equal to slightly more than the maximum height of one of the shells 40. In addition, plate 118 is adjusted to shift wire 121 toward or away from the wire 129 until the hook potrion 125 is spaced from the hook portion 132 a distance slightly greater than the diameter of one of the shells 40. Normally the wires 121 and 129 resiliently engage the shoulders formed by the flats 98 and 97, respectively, on the shaft 96, thereby holding the shaft in the position illustrated in FIGS. 4 and 5. With the shaft 96 in this position, the hook portion 132 projects upwardly through the slot 92 in the plate 65 and in front of the leading shell 40 (broken lines in FIG. 5) in the chute 60, while the hook portion 125 on the trailing wire 121 is disposed slightly beneath the upper surface of late 65, and in registry with the lower, open end of the next successive shell 40 in the chute.

After these adjustments have been made, compressed air is supplied to the hose 48 and 113, and power is applied to the bulb 80, the photoelectric cell 90 and the motor (not illustrated) which drives plate 24. As the disc 24 and plate 28 revolve, the shells 40, which are properly placed and oriented in the pockets 30, pass freely under feeler 56 on their way to the discharge slot 58.

If, however, one of the shells 40 is improperly seated in a pocket 30, so that some part of a shell projects far enough above plate 28 to engage the feeler 56, the valve 54 is instantly tripped, opening the valve 47 to admit a blast of compressed air from hose 49 through the registering opening 32 in the plate 24, so that the errant shell or shells 40 in the registering pocket 30 is or are blown out of the pocket and back into the hopper for reorientation.

Properly oriented shells 40, however, are rotated past the detector 56 and impelled by the deflector plate 59 out of the discharge 58 into the upper end of the chute 60.

As shown in FIG. 1, the upper end of chute 60 is bounded at one side thereof by the flexible member 79, which forms a curved guiding surface for directing shells into the space between members 66 and 75.

Assuming that the hook portion 132 remains in front of the leading shell 40 in the chute 60, the shells begin to back up in the chute until one of them (broken lines in FIG. 3) registers with, and covers the opening 88 in the plate 65. This blocks from the photocell 90 the light which is usually directed thereon from the lamp 82 by the conduit 86. The photoelectric cell is connected in a conventional manner with the motor which drives the disc 24. The rotation of this disc is therefore interrupted. This prevents the shells from backing up in the chute to the point where they would block discharge slot 58. If they did that, continued rotation of the disc 24 would be apt to cause damage to the shells attempting to be discharged from the hopper into the chute.

The shells 40 are adapted to be discharged one by one from the chute successively onto each of a plurality of equiangularly spaced working stations A, B, C, etc. on the turntable 112, which is mounted in a convenient position adjacent the lower or discharge end of the chute. Secured on the turntable adjacent the stations A, B, C, etc., are the pins A', B', C', etc., respectively, which engage successively with the roller 115 on the actuating arm 114 of the valve 110 as the turntable 112 rotates. When a shell 40 is deposited on the turntable at one of these work stations, an operator places a piece of cloth over the shell, and secures the cloth in the shell by forcing an insert or plug having an eyelet thereon into the shell, thus completing the assembly of a cloth-covered button.

Each time one of the pins A', B', C', etc. engages the roller 115, the valve 110 is opened momentarily and air under pressure is admitted momentarily through the hose 109 to the cylinder 105 (FIG. 4). This causes movement of the piston rod 104 toward the right in FIG. 4, causing the bottom of the slot 101 in its head 102 to strike the pin 99 and rock the shaft 96 out of its position of rest. This rotates the flat surfaces 98 and 97 from beneath the wire 121, and from above the wire 129, respectively, and causes rounded portions of the shaft 96 to engage these wires. As a consequence, wire 129 is forced downwardly, and wire 121 is forced upwardly. This disengages the hook portion 132 (FIG. 5) from the leading shell 40 in chute 60, thus permitting this shell to drop out of the chute 70, and onto the turntable 112. At the same time, the now-raised hook portion 125 on the wire 121 prevents the next shell, and all of the shells therebehind, from being discharged from the chute.

A brief moment later, as the roller 115 rides off the pin A', B', C', etc. with which it had been engaged, the piston rod 104 is forced back to the position shown in the drawings, and the wires 121 and 129 exert a torque on the shaft 96 rotating it back to its normal position, as shown in the drawings. The hook portion 132 is then shifted upwardly in front of what is now the leading shell 40 in the chute, and the hook portion 125 is returned to its normal position, so that the now-leading shell in the chute can slide forwardly into engagement with the hook portion 132. In this fashion, each time the valve 110 is tripped open by one of the pins A', B', C', on the turntable 112, one of the shells 40 is discharged from the chute.

From the foregoing it will be apparent that the above-described invention provides relatively compact and efficient means for automatically orienting and feeding articles of the type described one by one to a desired working station. The instant invention utilizes air to dislodge the improperly oriented shells from the pockets 30, thus eliminating the possibility of bending or crushing the button shells. A further advantage of the instant invention is that the chute 60 for conveying the shells 40 to the turntable 112 can be adjusted to accommodate differently sized shells. Moreover, these shells are fed automatically and one by one out of the chute onto the turntable, in response to a demand from the turntable. The turntable is rotated at a rate which is commensurate with the speed at which an operator can assemble the shells into cloth-covered buttons. When the turntable stops rotating, it indirectly stops the rotation of the orienter plate 24 by allowing shells to back up in the chute 60. This obviates need for separate controls for the orienter 10 and chute 60, eliminates unnecessary agitation of the items (shells 40) handled by hopper 10, and minimizes the build-up of objectionable static charges on the shells.

While the invention has been described in connection with an orienter and feeder for button shells it will be understood that it may be used instead for orienting and feeding various types of articles that can be fed from a hopper, such as nuts, washers, etc. Moreover, while chute 60 has been illustrated as being on the right side of hopper 10, as illustrated in FIG. 1, for special applications it may be desirable to place the chute on the left side of the hopper, in which case disc 28 would be rotated in the direction opposite to that indicated by arrow 25. Also, plate 118 may be adjusted to release two or more shells 40 at one time (one cycle of shaft 96) merely by shifting hook portion 125 rearwardly from hook 32 a distance greater than twice the diameter of a shell 40; and in this respect the mechanism functions as a counter, selecting a predetermined number of buttons for release each time shaft 96 is rocked.

While the invention has been described, then, in connection with a specific embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention, what I claim is:

1. Article orienting and feeding apparatus, comprising
    a hopper for holding a plurality of articles and including a stationary drum, and a disc mounted in the lower end of said drum for rotation about an axis inclined to the vertical, said disc having in its upper face a plurality of angularly spaced pockets, each of which is adapted to accommodate a properly oriented article,
    detecting means mounted on said drum above said disc for registry successively with the pockets in said disc, and for operation by an improperly oriented article in one of said pockets, as said disc rotates, and
    means responsive to the operation of said detecting means to direct a blast of air into the pocket containing an improperly oriented article to blow the latter out of the last-named pocket into the drum for re-orientation.

2. Article orienting and feeding apparatus as defined in claim 1 wherein
    the last-named means comprises a normally-closed valve adapted to be connected to a supply of air under pressure, and a duct for conducting air from said valve, when said valve is open, to the pockets of said disc successively as they rotate past a predetermined point, and
    said detecting means comprises a resilient feeler positioned in said drum just above said disc to be engaged and moved by improperly orented articles during the rotation thereof past said point by said disc, and operative each time it is moved by an article to open said valve momentarily.

3. Article orienting and feeding apparatus as defined in claim 1, including
    a chute mounted externally of said drum and having an inlet registering with a discharge opening in said drum,
    said chute defining an elongate conduit for conveying articles in single file from said discharge opening to the outlet of said chute, and
    means for adjusting said chute to vary the cross sectional area of said conduit, whereby differently sized articles may be conveyed therethrough.

4. Article orienting and feeding apparatus as defined in claim 1, including
    a chute mounted externally of said drum and having an inlet registering with a discharge port in said drum, said chute including an elongate conduit for conveying articles in single file from said discharge port to an outlet end,
    means mounted on said chute normally to block the outlet end of the chute, and
    means for preventing backing up of articles in said chute beyond a predetermined point, comprising
    a light source for directing a beam of light transversely across said chute at said predetermined point, and
    a photoelectric cell positioned normally to receive light from said beam and operative to interrupt the rotation of said disc, when an accumulation of articles in said chute causes one of said articles to block off said light beam from said photoelectric cell.

5. Article orienting and feeding apparatus as defined in claim 4 wherein
    said light source is disposed at a distance from said photoelectric cell, and
    a curved, clear plastic tube is disposed between said light source and said cell to conduct the light beam from said source to said cell.

6. Article orienting and feeding apparatus as claimed in claim 1, including
    a chute having an inlet end registering with a discharge port in said drum to receive and convey articles downwardly from said port to the outlet end of said chute,
    means normally blocking the lowermost article in the outlet end of said chute, and
    pneumatically-operated means for periodically releasing said blocking means to permit said lowermost article to be discharged from said outlet end.

7. Article orienting and feeding apparatus as claimed in claim 6, wherein
    said blocking means includes separate means for blocking discharge of the second lowermost article from said chute, when the lowermost article is discharged therefrom, and
    said pneumatically-operated means includes means for moving the first and second-named blocking means alternately to and from operative position, whereby one of said blocking means is in operative position when the other is in inoperative position.

8. Article orienting and feeding apparatus as defined in claim 6, wherein
    a turntable is mounted to rotate adjacent the outlet end of said chute to receive articles discharged therefrom,
    a plurality of actuating elements are mounted on said turntable at angularly spaced points about its axis, and
    said pneumatically-operated means includes a normally-closed valve having an actuating arm positioned to be tripped successively by each of said actuating elements during each revolution of said turntable.

9. Article orienting and feeding apparatus as defined in claim 6, wherein said blocking means comprises
    a pair of spaced members mounted on said chute to project into its outlet end, and
    movable cam means connected to said members normally to position one end of one of said members in said chute to engage and hold the leading article in said chute, and to hold the other member at the exterior of said chute,
    said pneumatically-operated means being operative periodically to move said cam means in opposite directions, and
    said cam means being operative upon movement thereof in one direction simultaneously to withdraw said one end of said one member from said chute to disengage said leading article, and to insert one end of said other member into said chute for engagement temporarily with the next successive article therein, and being operative upon movement thereof in the opposite direction to reinsert said one end of said one member in said chute for engagement with said next successive article, and to withdraw said one end of said other member from said chute.

10. Article orienting and feeding apparatus as defined in claim 9, wherein
    said cam means comprises a shaft mounted on said chute to oscillate in said opposite directions in response to said pneumatically-operated means, and having thereon intermediate its ends a pair of diametrally opposed, and axially spaced flats, and
    each of said members is resilient and normally is engaged intermediate its ends with one of said flats, and is engaged by the adjacent curved surface of the shaft, when the latter is rotated in said one direction, thereby momentarily to flex said members out of their normal positions.

11. Article orienting and feeding apparatus, comprising
    a hopper for holding a plurality of articles and including a stationary drum having a discharge opening therein, and a disc mounted in the bottom of said drum for rotation about an axis inclined to the vertical, said disc having therein a plurality of angularly spaced pockets, each of which is adapted to accommodate a properly oriented article to deliver the last-named article to said opening,
    means mounted for registry successively with the pockets in said disc to eject improperly oriented articles out of the pockets and into the drum for re-orientation, a chute mounted externally of said drum and having adjacent one end thereof an inlet opening registering with said discharge opening to receive therefrom properly oriented articles for delivery by said chute in single file to an outlet adjacent the opposite end of said chute, means on said chute normally blocking said outlet and operable intermittently to release articles from said outlet, said chute comprising a first member having a flat surface defining the bottom of said chute, and two side members adjustably mounted on said flat surface and defining opposite sides, respectively, of said chute, said first member having a first column of holes therein, and one, at least, of said side members having a second column of holes therein selectively registrable with the holes of said first column, and one of said columns being inclined to the other column, so that the centers of the holes in said one column are at progressively varying distances from a line passing through the centers of the holes in said other column, and a pin removably positionable selectively in different registering openings in said first and second columns to hold said one side member adjustably spaced from the other side member to adjust said side members toward and away from one another selectively to decrease and increase, respectively, the width of said chute.

12. Article orienting and feeding apparatus as defined in claim 11, wherein said first member has two, divergent, spaced columns of holes therein, both said side members have parallel columns of holes therein, and there are two pins removably engageable selectively in the different holes in each side member and in the corresponding holes in one column of holes, respectively, in said first member, thereby to hold said side members on said first member at progressively varying distances from one another.

References Cited

UNITED STATES PATENTS

| | | | |
|---|---|---|---|
| 1,970,574 | 8/1934 | Pelosi | 198—37 |
| 2,158,069 | 5/1939 | Grover | 198—37 |
| 3,044,660 | 7/1962 | Troll et al. | 193—43 |
| 3,101,832 | 7/1963 | Wyle et al. | 198—33 |
| 3,145,827 | 8/1964 | Bonsignore | 198—33 |
| 3,337,089 | 8/1967 | Bonfman | 227—160 |
| 3,340,031 | 9/1967 | Myers | 198—33 |

ANDRES H. NIELSEN, Primary Examiner

U.S. Cl. X.R.

198—33; 221—160